United States Patent

Goode et al.

[11] Patent Number: 6,163,272
[45] Date of Patent: Dec. 19, 2000

[54] METHOD AND APPARATUS FOR MANAGING PERSONAL IDENTIFICATION NUMBERS IN INTERACTIVE INFORMATION DISTRIBUTION SYSTEM

[75] Inventors: Christopher Goode, Menlo Park; F. Ray McDevitt, Woodside; Philip A. Thomas, San Jose, all of Calif.

[73] Assignee: DIVA Systems Corporation, Redwood City, Calif.

[21] Appl. No.: 08/738,343

[22] Filed: Oct. 25, 1996

[51] Int. Cl.[7] .................................................. G07D 7/00
[52] U.S. Cl. ...................... 340/825.34; 340/541; 348/5.5; 348/10
[58] Field of Search .................. 340/825.34, 825.31, 340/825.32, 541, 825.3; 235/382, 380; 238/375; 348/5.5, 10

[56] References Cited

U.S. PATENT DOCUMENTS

| | | |
|---|---|---|
| 4,578,567 | 3/1986 | Granzow et al. .................. 235/380 |
| 5,495,533 | 2/1996 | Linehan et al. ..................... 380/21 |
| 5,550,575 | 8/1996 | West et al. .......................... 348/5.5 |
| 5,579,489 | 11/1996 | Dornier et al. ..................... 395/281 |
| 5,675,647 | 10/1997 | Garneau et al. ..................... 380/20 |
| 5,706,507 | 1/1998 | Schloss ............................. 395/615 |
| 5,933,603 | 8/1999 | Vahalia et al. ................. 395/200.55 |

*Primary Examiner*—Michael Horabik
*Assistant Examiner*—Anthony A. Asongwed
*Attorney, Agent, or Firm*—Thomason, Moser & Patterson LLP

[57] ABSTRACT

A method and apparatus for managing the personal identification numbers of customers as well as customer authorization access to an interactive information distribution system. The apparatus comprises an interactive session manager containing a central processing unit that is programmed to implement the method includes. The method of the present invention is a personal identification number (PIN) assignment routine for assigning various types of PINs to various customers of the information distribution system. The method also includes an access authorization routine for restricting access to only those customers with authorized access to particular services.

8 Claims, 5 Drawing Sheets

METHOD AND APPARATUS FOR MANAGING PERSONAL IDENTIFICATION NUMBERS IN INTERACTIVE INFORMATION DISTRIBUTION SYSTEM

BACKGROUND OF THE INVENTION

1. Field of the Invention

The present invention relates to an interactive information distribution system such as a video-on-demand (VOD) system. More particularly, the invention relates to a method and apparatus for managing personal identification numbers within such an interactive information distribution system.

2. Description of the Background Art

Recent advances in digital signal processing techniques and, in particular, improvements in digital compression techniques, have led to a plethora of proposals for providing new digital services to a customer's home via existing telephone and coaxial cable networks. For example, it has been proposed to provide hundreds of cable television channels to subscribers by compressing digital video, transmitting the compressed digital video over conventional coaxial cable television channels, and then decompressing the video of the subscriber's set-top terminal. Another proposed application for this technology is a video-on-demand system in which a subscriber communicates directly with a video service provider via telephone lines to request a video program from a video library, and the requested video program is routed to the subscriber's home via telephone lines or via coaxial cable television cables for immediate viewing. Other proposed video-on-demand systems use a frequency multiplexing technique to enable transmission of control information from the customer's location through the cable network back to the information server.

For any of these interactive information distribution systems, an access authorization technique is necessary to provide system security. Such security must restrict use of the system only to authorized subscribers, insure that unauthorized purchases of information are not made on a customer's account, provide content restrictions to insure that certain members of a household (e.g., children) are restricted from viewing certain types of information, and provide customer budget controls. Present systems merely request a customer to provide a personal identification number prior to accessing the service. As such, all customers are generally burdened with the requirement to enter a password every time the service is accessed. Furthermore, such password based systems do not differentiate between household members. Thus, the password permits access to all system services and information.

Therefore, there is a need in the art for a method and apparatus of managing personal identification numbers and customer authorization within an interactive information distribution system to provide flexible and useful security measures.

SUMMARY OF THE INVENTION

The disadvantages heretofore associated with the prior art are overcome by the present invention of a method and apparatus for managing the personal identification numbers of customers as well as customer access to an interactive information distribution system. The apparatus comprises an interactive session manager containing a central processing unit that is programmed to implement the method of the present invention. The method of the present invention is a personal identification number (PIN) assignment routine for assigning various types of PINs to various customers of the information distribution system. The method also includes an access authorization routine for restricting access to only those customers with authorized access to particular services provided by the system.

More specifically, the PIN assignment routine allows each customer to set up either a full access PIN, a master PIN, or a default PIN. The full access PIN allows access to all services provided by the system without the need to enter the PIN upon each access to the system. The default PIN is a PIN that is assigned to a household with predefined default parameters permitting limited access to particular services provided by the distribution system as well as limited content access and limited spending. The default parameters can be defined upon assigning the PIN to the household. The master PIN is assigned to a household such that the holder of the master PIN may assign subaccount PINs to various members of the household. Each of these subaccount PINs can be assigned certain parameters that limit the types of services that the holders of those PINs are permitted to access. Each subaccount can also be restricted as to spending amounts, viewable content, viewing time of day, and the like.

Upon a customer requesting access to the information distribution system, the access authorization routine is executed upon the interactive session manager. This routine identifies the terminal which is requesting access and from the terminal identification performs a look-up of the access authorization level that is assigned to that terminal. That access authorization level may be full access, default access or master access. If the terminal is assigned a full access authorization level, then no further authorization is necessary, and all services provided by the information distribution system are available to that household. If the default level is set for that terminal, then access is granted to the default services, i.e., those services that were defined as the default services using the default parameters during the PIN assignment routine. If, during a session that is using the default services, a customer requests a non-default service, the routine will request a PIN for those non-default services, and if a valid PIN is entered, then access to those services shall be permitted. If a valid PIN is not entered, then access is denied, and the customer continues to be provided the default services only. If the authorization level is a master authorization level, the routine checks to see if this master authorization level has a default set of parameters such that there are default services that are accessed immediately after the terminal is identified, i.e., without further authorization. If default access is not available, the customer must enter a PIN for all services, or if services outside of the default services are requested, then a PIN must be entered for those non-default services. Once a PIN is entered and it is found to be valid, access is provided to a pre-defined level of service defined by the PIN that has been entered. Further requests for services outside of the pre-defined level of services will require a different valid PIN to be entered. As such, children can be restricted to certain content levels such as restrictions based upon the MPAA rating for certain types of movies, restrictions as to adult content, restrictions to viewing at only certain times of day, and the like. In addition, each household member can be given a PIN that has restricted spending such that each household member can only purchase a certain number of movies per month.

A second embodiment of the invention is a simplified version of the foregoing embodiment. The second embodiment contains a PIN assignment routine that assigns to each terminal either restricted or unrestricted access. If access to the services is unrestricted, then no PIN is assigned. If access is restricted, then a selected level of service is chosen and a PIN assigned for that level. If sub-account PINs are desired, other levels of service and PINs can be assigned to the terminal. The level of service is based upon the MPAA rating system; however, other basis for service restriction are available. Thus, a PIN is allocated a certain MPAA rating level and that customer using PIN is permitted access to information at that level or less. The simplified PIN assignment routine is generally executed by the service provider when the service is first ordered.

The second embodiment of the invention also contains a simplified access authorization routine. This routine identifies the terminal and whether the terminal has unrestricted or restricted access. If unrestricted, then all services are accessible without the use of a PIN. If restricted, the routine requests a PIN. The access level for that PIN is looked up and access permitted. The user only receives previews and information at or below its access level, e.g., an R level can view R, PG-13, PG, and G rated information. The user is never prompted for a PIN to access higher level material because that material is not presented for selection.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
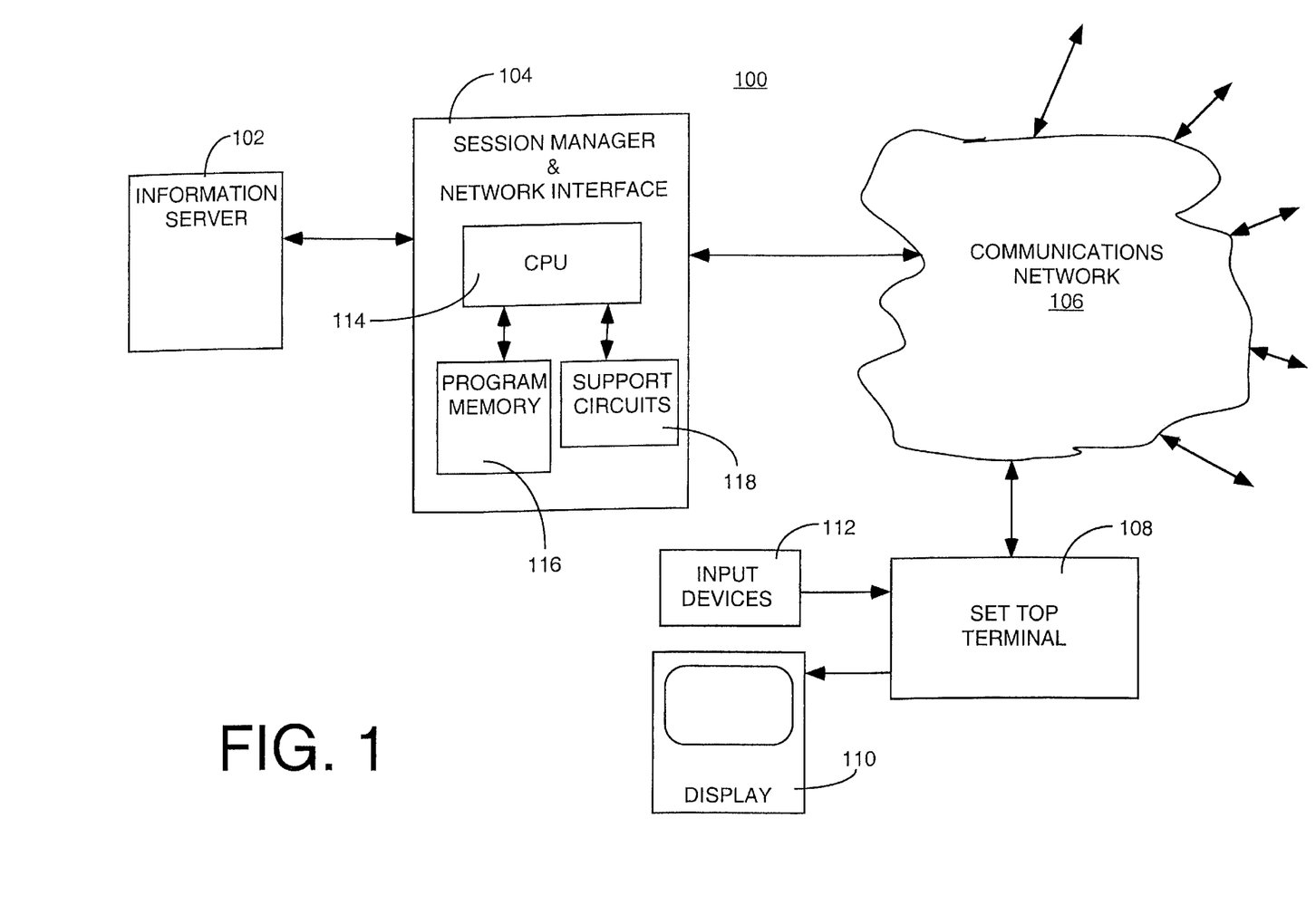
FIG. 1 depicts a high-level block diagram of an interactive information distribution system containing the present invention.

FIG. 1 depicts a high-level block diagram of an interactive information distribution system 100 that incorporates the present invention. The system 100 contains an information server 102, a network interface and interactive session manager 104, a communications network 106, a set-top terminal 108, a display device 110, and an input device 112 for inputting functions into the set-top terminal 108. The information server 102 provides data streams in response to requests for information from the network interface 104. These data streams are modulated onto a carrier that is compatible with the transmission requirements of the network 106. Network interface 104 handles all the transmission interface requirements of the system 100. The network can be one of a number of conventional communications networks that are available such as fiber optic networks, telephone networks, existing cable television networks, and the like. The data is generally transmitted in asynchronous, packetized format such as defined in the asynchronous transfer mode (ATM) protocol or the Moving Pictures Experts Group (MPEG).

The set-top terminal 108 receives the data streams from the network, demodulates those streams and processes the information carried by the streams for display on the display device 110. In addition, the set-top terminal 108 accepts commands from the input device 112, e.g., a remote control or other similar input device. These commands are formatted, compressed and transmitted through the network to the network interface which interprets the commands sent from the set-top terminal and instructs the information server to perform the command, e.g., transmits selected information or a new selection menu.

More particularly, the information server 102 contains at least one central processing unit (CPU) 120 and may contain many processing units arranged as a parallel processing computer. Additionally, the server generally contains a program memory 122 that retains the programs which control the server and are executed when the function requests are sent from the set-top terminals. In addition, the server is connected to a data memory 124. The data memory 124 contains the various video data and other information that is available to the subscribers via the system 100.

The interactive session manager and network interface 104 also contains a central processing unit (CPU) 114. The manager generally contains a program memory 116 which stores the computer programs that are executed by the session manager to control an interactive session. In addition, the CPU is coupled to various support circuits 118 such as power supplies, memory, clock circuits, and the like. In the present invention, the program memory of the session manager stores the PIN assignment routine and the access authorization routine of the present invention. These routines are discussed below with respect to FIGS. 2, 3, 4 and 5.

Additionally, the set-top terminal 108 contains a transceiver (not specifically shown) for sending an receiving information to/from the network. The transceiver downconverts and demodulates the information from the network which is generally transmitted in a standard packetized transmission format. The video data (if any) within the transmission is generally encoded using either of the available Moving Pictures Expert's Group standards, e.g., MPEG-1 or MPEG-2. The decompressed information is then prepared for display upon the display unit 110. Such bi-directional set-top terminals that send digital information in response to user commands are well known in the art.

In operation, a customer, through the input device and interactively selecting functions from a graphical display menu, may initiate an interactive information session wherein the customer requests certain information to be displayed on the display device 110. Typically, in a video-on-demand system, the information to be displayed would be a movie. Upon requesting a session, the set-top terminal sends through the network a command requesting that a session be initiated. The initialization command carries a unique terminal identification (TID) code. For system security purposes, this code is randomly and automatically changed by the system, e.g., the system periodically downloads encrypted TID codes to the set-top terminals via the network. Once a valid TID code is received, the session manager opens a session account for the particular terminal. The session manager then sends a request to the server for the information that was requested by the set-top terminal. The server recalls the requested information from the data memory and passes that information to the network interface which, in turn, passes it to the network, and, ultimately, to the particular set-top terminal that requested the information. To insure security, the session manager, when it receives a session initiation request, performs a look-up function to validate the TID within a look-up table and also executes the access authorization routine of the present invention. Prior to or at the time of the first session being requested, the customer, through his/her set-top terminal, must execute the PIN assignment routine such that a personal identification number is assigned to at least one person in the household.

Figure 2:
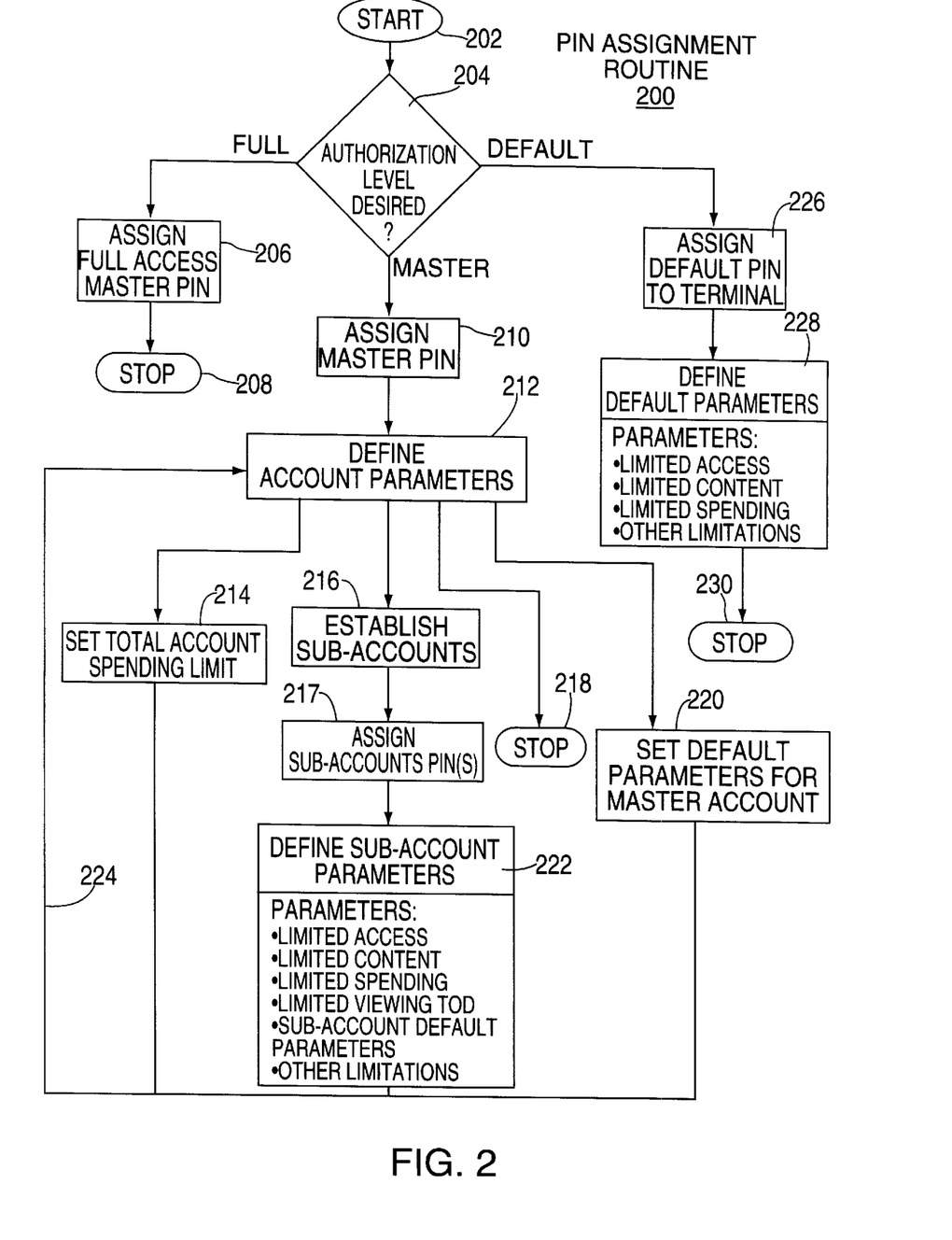
FIG. 2 depicts a flowchart of the PIN assignment routine.

FIG. 2 depicts a flowchart of the PIN assignment routine 200. The routine begins at step 202 and continues to step 204. At step 204, the routine requests what authorization level is desired for the household. The menu-driven choices are full-access authorization (FULL), a master access authorization (MASTER), or a default authorization (DEFAULT). If full access authorization is requested, the PIN assignment routine assigns, at step 206, a full-access master PIN to that terminal and associates that PIN with the TID code. Typically, this information (e.g., TID and PIN) is stored in a look-up table. As the TID codes are changed, the look-up table must also be updated. Once the PIN is stored, the routine 200 is stopped at step 208.

If the default level of authorization is selected at step 204, the routine proceeds from step 204 to step 226. At step 226, the routine assigns a PIN to the terminal. This PIN allows access to a subset of the services provided by the information distribution system. At step 228, the services that are accessible using the default PIN are defined as default parameters. These default parameters may include content restrictions that do not allow access to movies exceeding a certain MPAA rating or restrict access to movies in a certain genre, e.g., adult movies. Additionally, access may be limited to only children's programs, viewing at only a specific time of day, and to a limited amount that can be spent on services over some arbitrary period of time, e.g., day, month, and the like. Once the default parameters are set in step 228, the routine stops at step 230. Typically, the default parameters are pre-defined by the service provider.

If, at step 204, the master authorization level is selected, the routine proceeds to step 210. At step 210, the routine assigns a master PIN to the terminal. At step 212, the holder of the master PIN is permitted to define certain account management parameters. These parameters are generally menu-driven such that each parameter is selected from a menu and then the fields defining that parameter are filled in by the master PIN holder. Of course, this process can be accomplished by the service provider as well. Illustratively, the four parameters are spending limits for the entire account (step 214), establishing subaccounts (step 216), setting default parameters for entry into the system (step 220), and a stop command (step 218).

The account management parameters allow, at step 214, the establishment of spending limits for the account such that all the users of that terminal cumulatively cannot exceed a certain spending limit per, for example, month. Once the spending limit is set, the routine returns along path 224 to the account management parameter definition step 212. The spending limit per account may have a preset maximum that is set by the service provider. The customer could then establish a value less than the preset maximum.

The parameters may also be used to establish subaccounts at step 216. At step 217, each of the subaccounts is assigned its own unique PIN such that each customer within a household can be assigned a PIN having their own limits on what services they can access within the information distribution system. At step 222, restrictive parameters are associated with each sub-account PIN. These subaccount parameters may include spending limits, content limits, viewing time of day limits, as well as certain default parameters that allow viewing of certain default services without entering a PIN. Additionally, at step 220, the account management parameters enable the master PIN holder to set a default path through which the household may have access to default limited services. To access further services (i.e., non-default services), a subaccount PIN would be required.

Once all of the account management parameters are defined, the stop step is selected at step 218 such that the PIN assignment routine is ended. At this point, a household has established its PIN for the various members of the household, as well as define default parameters for accessing particular services without entering a PIN.

Figure 3:
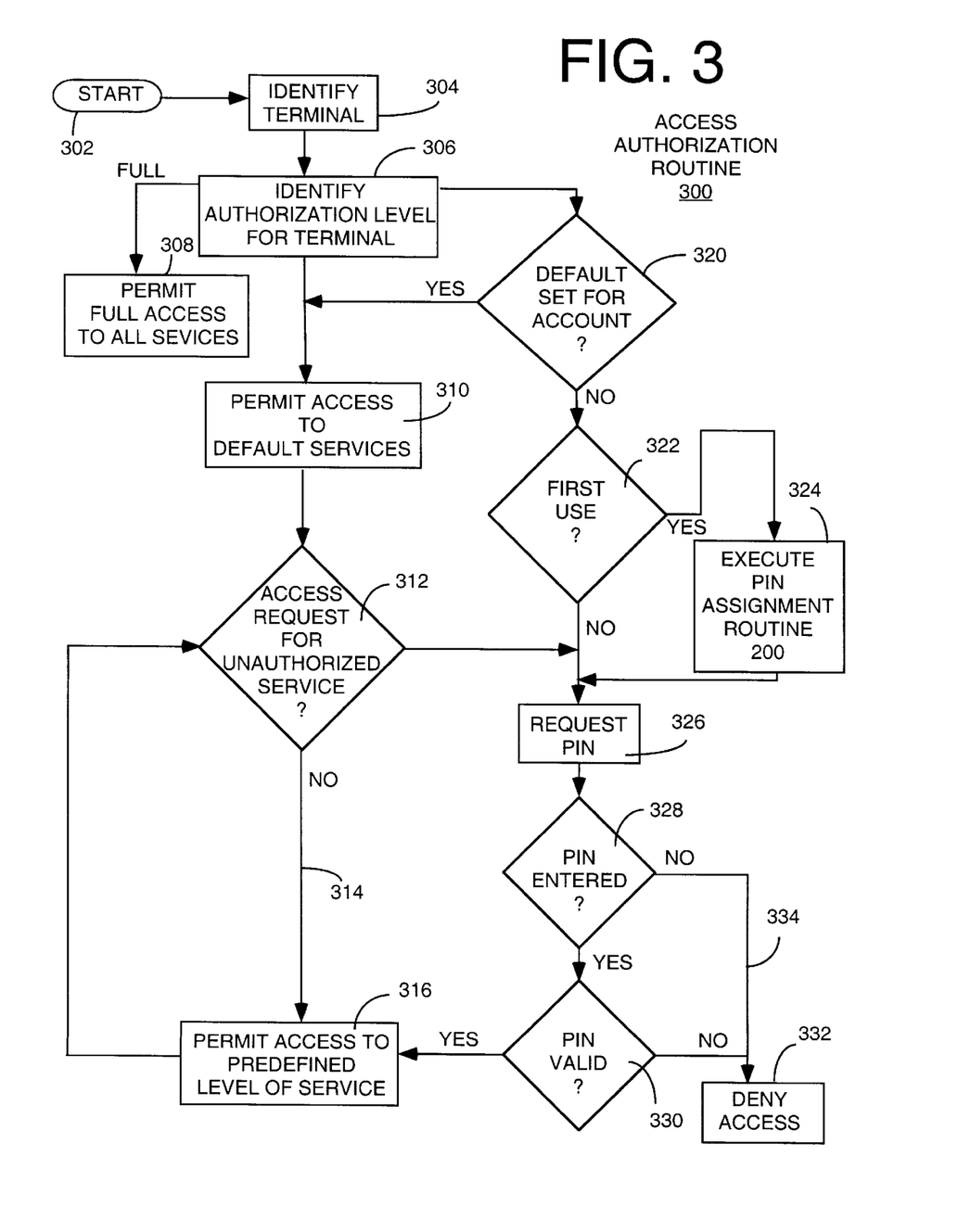
FIG. 3 depicts a flowchart of the access authorization routine.

FIG. 3 depicts a flowchart of the access authorization routine 300. Routine 300 begins at step 302 and proceeds to step 304. At step 304, the routine identifies and validates the terminal by its TID code that is carried within the information supplied by the terminal when initiating a session. At step 306, the routine identifies the authorization level that is assigned to that particular terminal. Generally, such identification is accomplished through the TID-PIN look-up table. The three levels of authorization are full, default, and master.

If the terminal has full authorization, then no further authorization is necessary and at step 308, the session manager allows the terminal and its customer to have full access to all services provided by the interactive information distribution system. Typically, such a full access authorization would be used by households that have no children or households that do not want to have restrictions on access to the system. With full access, the randomly generated and updated TID code provides sufficient security for the system, and a PIN being entered by the customer is not necessary.

If the authorization level is the default authorization level, the routine proceeds from step 306 to step 310 where access is granted to all of the default services that are allocated to that terminal without the necessity of entering a PIN. The default services are usually predefined by the service provider. However, the system is flexible enough to permit the customer to define the default services, as described below. If a customer requests another service, the routine queries whether the request is for a non-default service (unauthorized service) at step 312. If the requested service is a default service, then the routine proceeds along path 314 allowing access, at step 316, to that default service, e.g., the predefined level of service. However, if the request was for a non-default service, then the routine requests a PIN for access to that service at step 326. At step 328, the routine queries whether a PIN has been entered. If not, the routine proceeds along path 334 and, at step 332, denies access to the new service. However, if a PIN has been entered, the routine proceeds to step 330 where the entered PIN is checked against a list of valid PINs. If the PIN is not valid, the routine denies access, at step 332, to the service and returns to the default services. If, however, the PIN is valid, the routine proceeds to step 316. At step 316, access to the requested service is permitted. If another service is requested, the routine queries at step 312 whether the requested service is an authorized service within either the default services or the previously-entered PIN. If the query is answered negatively, the routine returns to step 316 permitting access to the newly-requested service. However, if the requested service is unauthorized for either the default services or the previously-entered PIN, the routine proceeds to step 326 and again requests a PIN to permit access to those presently unauthorized services.

If, at step 306, the authorization level is the master authorization level, the routine proceeds to step 320. At step 320, the routine checks to see if there are default services parameters established for this particular terminal. If so, the routine proceeds to step 310 where access is granted to those default services. From then on, the system operates as if there are default services only, and for each requested new service that is outside of the default set, a PIN is requested.

If, at step 320, there are no default parameters established, the routine proceeds to step 322, where the routine queries whether this is the first use of the information distribution system under this master PIN. Typically, upon installation of a set-top terminal, a new account is automatically assigned a "null" master account number which causes the system, upon first access, to default to the master authorization level carrying the null PIN, and as such, the query at step 322 is affirmatively answered, and at step 324, the session manager executes the PIN assignment routine 200 as described above. Consequently, the customer is assigned a new PIN to replace the null PIN, the default parameters are established, subaccounts are defined and so on.

Once the PIN has been assigned or if this is not a first use and the master does not carry the null PIN, the routine proceeds to step 326 wherein the routine requests a PIN number for access to services of the information distribution system. At step 328, the routine queries whether a PIN has been entered. At step 328, the routine queries whether a PIN has been entered. If a PIN is not entered, the routine denies access at step 332. Typically, there is a wait loop that awaits entering of a PIN for a certain amount of time before access is denied at step 332. If the PIN is entered and the query at step 328 is answered affirmatively, the routine proceeds on to step 330. At step 330, the routine queries whether the PIN is valid. If the PIN is not valid, at step 332, access is denied to the requested services. If the query, at step 342, is affirmatively answered the routine proceeds to step 316 where access to the predefined level of services for that particular PIN is permitted.

If during the session providing the predefined level of services, the customer requests other services the routine proceeds to the query at step 312 wherein the routine queries whether the new services requested are unauthorized services, e.g., not within the predefined level of services of step 316. If the services are authorized, the routine proceeds along the NO path 314 to step 316 and allows access to the services. If the services are unauthorized for the presently entered PIN, the routine proceeds along the YES path to step 326 where a valid PIN is requested for access to the unauthorized services.

Figure 4:
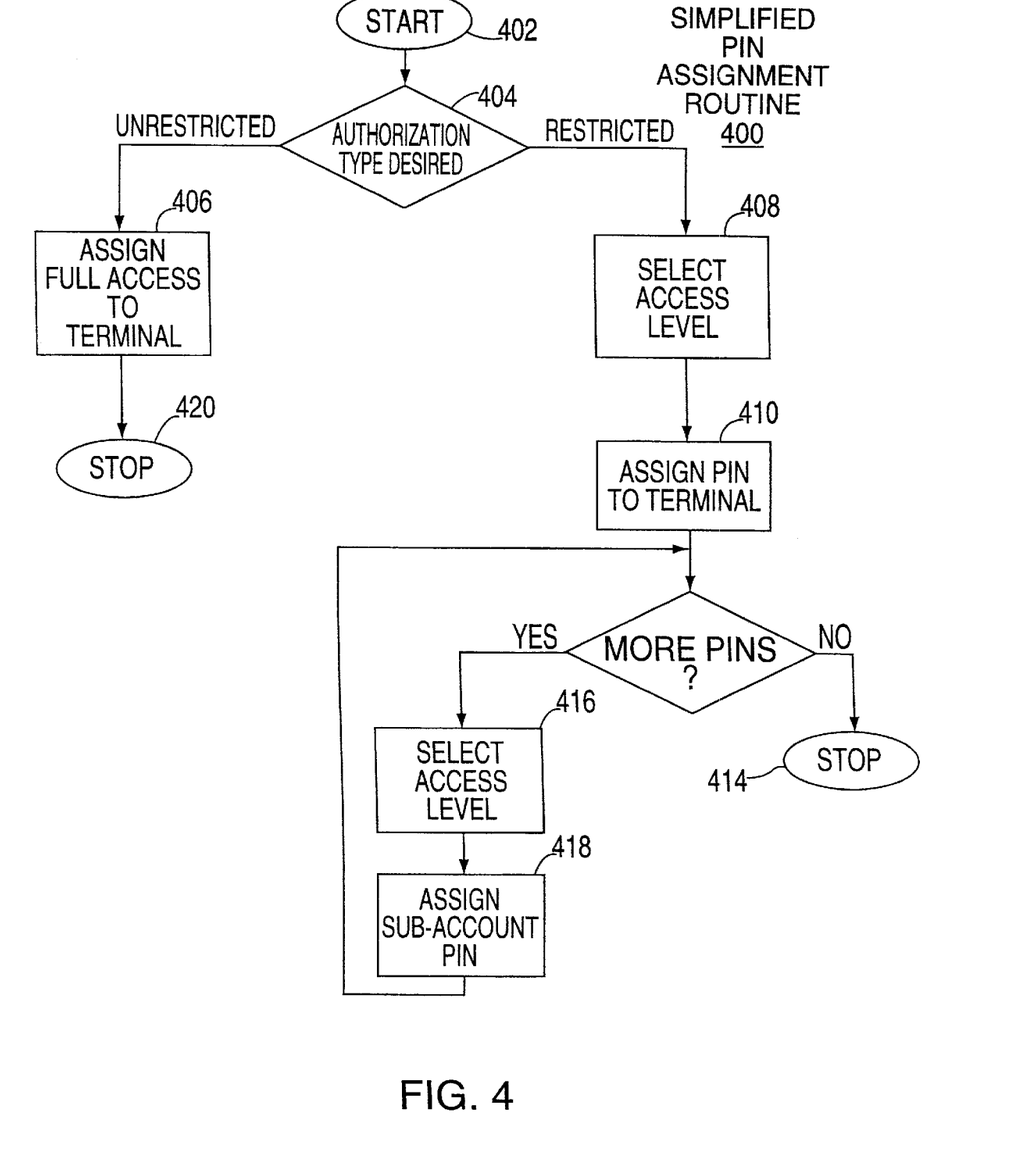
FIG. 4 depicts a flow chart of a simplified PIN assignment routine.

FIG. 4 depicts a second embodiment of the PIN assignment routine 200 of FIG. 2; namely, a simplified PIN assignment routine 400. This routine is designed to restrict the options for PIN assignment and selected access levels. Thus, the routine begins at step 402 and proceeds to step 404. At step 404, the routine queries as to the authorization type desired. The type may be either unrestricted or restricted authorization. If the authorization type is unrestricted, the routine proceeds to step 406. At step 406, the routine assigns a full access indicator to the particular terminal associated with this authorization. At step 420, the routine stops. Under unrestricted access, system security relies upon the randomly assigned and intermittently updated TID codes.

If restricted service is requested, the routine requires an access level for the service to be selected at step 408 from a menu or list of available access levels. At step 410, the routine assigns a PIN to the particular terminal, and that PIN is associated with the access level defined in step 408. For the simplified version of the PIN assignment routine, the access levels are generally based on the MPAA rating system. As such, the access levels can be selected from the following: Adult (All Services), NC-17, R, PG-13, PG, and G. Of course, services could be allocated to access levels in many other ways. At step 412, the routine queries whether additional PINs are to be assigned to the terminal. If the query is affirmatively answered, the routine proceeds to step 416 wherein another access level is selected. At step 418, a subaccount PIN is assigned and associated with the selected access level. The routine then returns to the query at step 412. As such, the loop including steps 412, 416 and 418 may be repeated until all PINs for all household members are assigned. When no more PINs are to be assigned at step 412, the routine ends at step 414. Typically, the simplified PIN assignment routine 400 is executed by the service provider at the time the service is first ordered to assign various PINs to the head of the household, and the head of household can distribute the subaccount PIN numbers to other family members.

Figure 5:
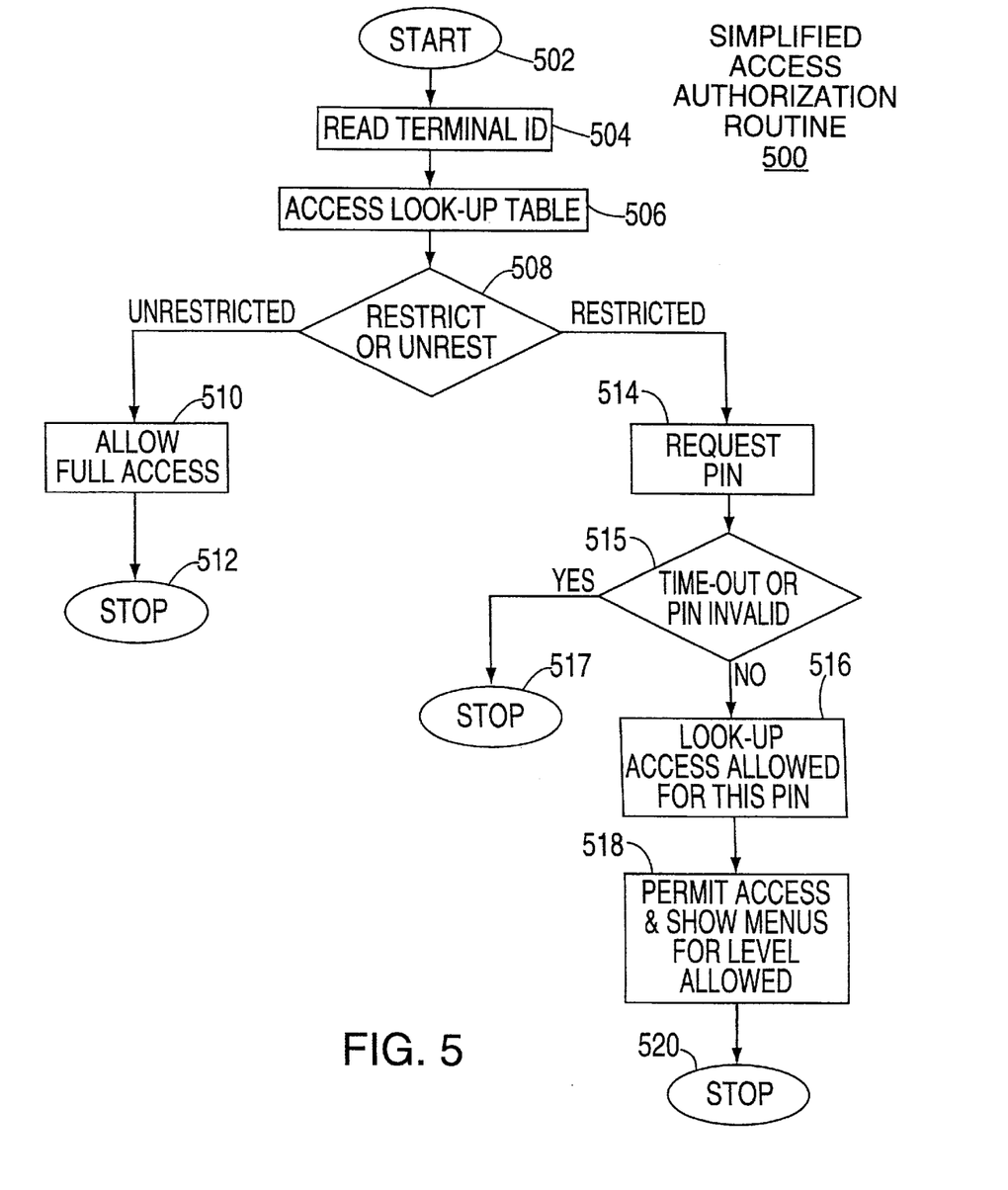
FIG. 5 depicts a flowchart of a simplified access authorization routine.

FIG. 5 depicts a second embodiment of the access authorization routine 300 of FIG. 3; namely, a simplified access authorization routine 500. This routine is simplified, in that, it provides access to unrestricted users and restricted users that have a PIN. The PIN must be valid and if so, it provide access to a particular level of service. A particular level of service cannot be exceeded without a different PIN, and once a particular level of service has been accessed, there is no opportunity to select a higher level of service without starting a new session for the service, e.g., menus for selecting services or information in unaccessible levels are not displayed to the customer. Specifically, the routine 500 begins at step 502 and proceeds to step 504. At step 504, the routine reads the set-top terminal identification code, and at step 506, uses that identification code to access a look-up table to determine if that terminal has unrestricted or restricted access. At step 508, if the look-up table returned an unrestricted access designator, the routine proceeds to step 510. At step 510, the routine allows full access to all services. The routine ends at step 512. If, however, the service is restricted, the routine proceeds from step 508 to step 514. At step 514, the routine requests entry of a PIN. At step 515, the routine queries whether the PIN is invalid or a time-out has occurred, i.e., a PIN has not been entered within a predefined period of time. If the query at step 515 is affirmatively answered, the routine stops at step 517. If the query at step 515 is negatively answered, the routine proceeds to step 516, wherein a look-up table is accessed to match the PIN number to the access level. At step 518, the routine permits access to the system as defined by the access level associated with the PIN. The level of access is restricted to the highest access level associated with that PIN, and all lower level accesses, e.g., if an R access level is available, then access is permitted to all information having R, PG-13, PG and G ratings. In addition, under the simplified access authorization process, the viewer is only permitted access to menus and previews that fit within the access level provided for that PIN. Consequently, browsing through titles, previews and menus of higher-level accesses is not permitted. The routine stops at step 520.

Using the method and apparatus of the present invention a flexible customer authorization and access management system is available for use with an information distribution system. Under such a system the customer as well as the system is secure from unauthorized use and billing as well as allowing the customer to establish limitations for household members and to avoid unnecessary entry of identification numbers at all times.

Although various embodiments which incorporate the teachings of the present invention have been shown and described in detail herein, those skilled in the art can readily devise many other varied embodiments that still incorporate these teachings.

What is claimed is:

1. A method of assigning personal identification numbers to set top terminals within an interactive video on demand system, said interactive video on demand system comprising an information server including a memory and coupled to a plurality of set top terminals via a communications network, said interactive video on demand system providing video streams to said set top terminals via said communications network, said method comprising the steps of:

assigning, in response to subscriber interaction, one of a restricted and unrestricted level of video stream access for a set top terminal associated with said interacting subscriber;

storing, in said information server memory, indicia of said assigned video stream access level for said set top terminal associated with said interacting subscriber, said unrestricted level of video stream access being associated with the set top terminal of an interacting subscriber entitled to immediately receive any unrestricted video stream upon request, said restricted level of information access being associated with the set top terminal of an interacting subscriber entitled to immediately receive a restricted portion of said unrestricted video streams upon request; and assigning, in the case of said set top terminal associated with said interacting subscriber having a restricted level of information access, a restricted personal identification number (PIN) to said set top terminal associated with said interacting subscriber and defining parameters that provide defined access to said interactive information distribution system.

2. The method of claim 1 further comprising the step of:

defining, in the case of said set top terminal associated with said interacting subscriber having a restricted level of information access, sub-account parameters that provide defined access to said interactive information distribution system for a sub-account PIN.

3. The method of claim 2 wherein said parameters and said sub-account parameters are program rating codes.

4. The method of claim 2 wherein said default parameters restrict access based upon program content, spending, and time of day.

5. The method of claim 2 wherein said sub-account parameters restrict access based upon a sub-account PIN, program content, spending, and time of day.

6. Apparatus for assigning personal identification numbers to set top terminals within an interactive video on demand system, said interactive video on demand system comprising an information server coupled to a plurality of set top terminals via a communications network, said interactive video on demand system providing video streams to said set top terminals via said communications network, said apparatus comprising:

a controller, for interacting with a subscriber via said communications network, and for assigning one of a restricted and unrestricted level of video stream access for a set top terminal associated with said interacting subscriber, said unrestricted level of video stream access being associated with the set top terminal of an interacting subscriber entitled to immediately receive any unrestricted information upon request, said restricted level of information access being associated with the set top terminal of an interacting subscriber entitled to immediately receive a restricted portion of said unrestricted video streams upon request; and memory, coupled to said controller, for storing indicia of said assigned level for said set top terminal associated with said interacting subscriber;

said controller assigning, in the case of said set top terminal associated with said interacting subscriber having a restricted level of information access, a restricted personal identification number (PIN) to said set top terminal associated with said interacting subscriber and defining parameters that provide defined access to said interactive information distribution system.

7. The apparatus of claim 6 wherein:

said controller defines sub-account parameters that provide defined access to said interactive video on demand system for a sub-account PIN if said selected authorization type is restricted.

8. The apparatus of claim 7 wherein said parameters and said sub-account parameters are program rating codes.

* * * * *